(12) United States Patent
Hadlauer

(10) Patent No.: US 12,170,503 B2
(45) Date of Patent: Dec. 17, 2024

(54) DISTRIBUTOR UNIT

(71) Applicant: Martin Hadlauer, Graz (AT)

(72) Inventor: Martin Hadlauer, Graz (AT)

(*) Notice: Subject to any disclaimer, the term of this patent is extended or adjusted under 35 U.S.C. 154(b) by 0 days.

(21) Appl. No.: 18/708,811

(22) PCT Filed: Nov. 9, 2022

(86) PCT No.: PCT/EP2022/081353
§ 371 (c)(1),
(2) Date: May 9, 2024

(87) PCT Pub. No.: WO2023/083905
PCT Pub. Date: May 19, 2023

(65) Prior Publication Data
US 2024/0333207 A1    Oct. 3, 2024

(30) Foreign Application Priority Data

Nov. 9, 2021  (AT) .............. A 60277/2021

(51) Int. Cl.
*H02S 20/32* (2014.01)
*H02S 20/10* (2014.01)
*H02S 30/10* (2014.01)

(52) U.S. Cl.
CPC .............. *H02S 20/32* (2014.12); *H02S 20/10* (2014.12); *H02S 30/10* (2014.12)

(58) Field of Classification Search
CPC ........... H02S 20/32; H02S 20/10; H02S 30/10
See application file for complete search history.

(56) References Cited

U.S. PATENT DOCUMENTS

| 3,990,731 | A | 11/1976 | Schnipke |
| 4,209,192 | A | 6/1980 | Knight |
| 10,778,140 | B2 | 9/2020 | Ona et al. |
| 2015/0184894 | A1* | 7/2015 | Verma ............ F24S 50/20 126/620 |
| 2017/0038096 | A1* | 2/2017 | Hilliard ............ F24S 80/50 |

FOREIGN PATENT DOCUMENTS

WO    2021121858 A1    6/2021

OTHER PUBLICATIONS

International Search Report and Written Opinion received in International Application No. PCT/EP2022/081353 dated Feb. 13, 2023, 15 pages.

* cited by examiner

*Primary Examiner* — Jayne L Mershon
(74) *Attorney, Agent, or Firm* — Liang & Hennessey LLP; Brian Hennessey

(57) ABSTRACT

A distributor unit for a tracking unit for a solar collector, the distributor unit including at least one first line section with a first rotational block, which is designed to establish a fluidic connection between the first line section and a base element, in particular an upright, and a second line section with a second rotational block, which is designed to establish a fluidic connection between the second line section and a first support arm of the solar collector. The first line section is rotatably connected to the first rotational block, and the second line section is rotatably connected to the second rotational block.

20 Claims, 7 Drawing Sheets ions. Furthermore, according to a further object of the invention, rotation about the vertical axis (azimuth) should be possible without restriction (any number of circular rotations); the possibility of rotation about the horizontal axis (solar altitude) should be at least 180°. Furthermore, according to a further object of the invention, it should be possible to swivel the solar collectors, in particular mirror collectors, or solar cells into a protective position pointing downwards towards the ground in order to be able to quickly remove and safely store particularly critical components (e.g. mirrors) during storms or other extreme weather conditions. Furthermore, according to a further object of the invention, the control unit should be able to be accommodated inside the tracking unit. Other modules (electronics, sensors, cleaning equipment, etc.) should also be able to be accommodated directly in the tracking unit in order to be protected against environmental influences (e.g. sandstorms, hail). Furthermore, according to a further object of the invention, it should be possible to bring the solar collectors and/or cells into the protective position by hand if the tracking system fails, for example due to a faulty motor. The invention is also intended to enable uncomplicated maintenance of these components, despite the protected housing of critical components. Further objects of the invention may be found in the description.

DISTRIBUTOR UNIT

CROSS-REFERENCE TO RELATED APPLICATIONS

The present application is a national phase application of PCT Application No. PCT/EP2022/081353, filed Nov. 9, 2022, entitled "DISTRIBUTOR UNIT", which claims the benefit of Austrian Patent Application No. A 60277/2021, filed Nov. 9, 2021, each of which is incorporated by reference in its entirety.

BACKGROUND OF THE INVENTION

1. Field of the Invention

The present invention relates to a distributor unit for a tracking unit for a solar installation, to a tracking unit for a solar installation, and to a solar installation.

2. Description of the Related Art

Tracking units for solar installations, especially those for biaxial tracking of the solar collectors and/or solar cells, have so far had the major disadvantage that all the lines of the system, such as hydraulic or steam lines, electrical lines and lines for cleaning fluid, were routed exposed along the uprights and support arms of the solar installation, which is associated with a high frequency of failure and correspondingly high maintenance costs due to the lack of protection of these lines against the effects of the weather. If these lines were only occasionally housed internally—and thus protected from the weather—inside the uprights and/or support arms, the disadvantage was always that the maintenance of these lines was very time-consuming due to their inaccessibility. In addition, constructions with correspondingly flexible hoses, which are necessary due to the constant tracking movements, are very expensive and the installation of such systems is also extremely complex, especially due to the laborious production of all connections.

SUMMARY OF THE INVENTION

The object of the present invention is therefore to enable a biaxial tracking system for a solar installation which avoids the disadvantages known from the prior art. In particular, a tracking unit with ready-to-connect outlets is to be provided for all lines of the solar installation, in particular hydraulic or steam, electrical or other supply and operating lines, which allows all lines to be rerouted safely and independently of the angle of rotation. Furthermore, according to a further object of the invention, it should be possible to divert the flow and return lines of the upright inside the tracking unit via both axes of rotation (azimuth and elevation angle or solar altitude), preferably sealingly up to 30 bar operating pressure, and to divide them into two partial flows for two support arms of the solar installation. Furthermore, according to a further object of the invention, it should be possible to discharge superheated steam at up to 400° C. in an internally guided manner. Furthermore, according to a further object of the invention, it should be possible to provide a hydraulic supply line with diversion via the rotary axes for cleaning agents (cleaning water). Furthermore, according to a further object of the invention, it should be possible to equip the solar installation with outlets for electrical lines for PV power, wherein the rerouting of these electrical lines should also take place inside the tracking unit and should not be subject to any rotational angle restrict An object of the invention is solved by a distributor unit for a tracking unit for a solar installation, said distributor unit comprising at least a first line section with a first rotational block, which first rotational block is configured to establish a fluidic connection between the first line section and a base element, in particular an upright, of the solar installation, and a second line section with a second rotational block, which second rotational block is configured to establish a fluidic connection between the second line section and a first support arm of the solar installation, wherein the first line section is rotatably connected to the first rotational block, and wherein the second line section is rotatably connected to the second rotational block. This creates a distributor unit that makes it possible to provide a ready-to-connect tracking unit for a solar installation that may be installed in a simple and uncomplicated manner. In particular, the rotational blocks, which are rotatably connected to the line sections and may be equipped with connection sections (connection flanges) matched to the line connections of the external lines, allow on the one hand a simple and tight connection to external lines, in particular hydraulic or steam-conducting lines of the base element on which the distributor unit is mounted, as well as to corresponding lines of the first support arm of the solar installation, on which support arm the solar collectors or cells are mounted; on the other hand, the rotatable and sealed connection of the rotational blocks to the respective line sections of the distributor unit also makes it possible to connect the external lines to the rotational blocks in a torsionally rigid (or non-rotatable) manner, so that neither the external lines nor the line sections of the distributor unit itself need to be flexible in order to enable the rotations taking place in the operating state of the solar installation being tracked. These rotations are rotations of the base element relative to the distributor unit (tracking in relation to azimuth) and rotations of the first support arm relative to the distributor unit (tracking in relation to solar altitude).

According to a preferred embodiment of the invention, the distributor unit has a third line section with a third rotational block, which third rotational block is set up to establish a fluidic connection between the third line section and a second support arm of the solar installation, wherein the third line section is rotatably connected to the third rotational block. This enables the distributor unit according to the invention to be used in conjunction with tracking units for solar installations with two support arms. The rotatable connection of the third rotational block to the third line section ensures that the second support arm may be brought into a rotational position which may be selected independently of a rotational position of the first support arm. Furthermore, all statements made in relation to the second line section, the second rotational block and/or the first support arm also apply to the third line section, the third rotational block and/or the second support arm. The first line section and the second line section may form an angle of between 0° and 360° with each other, preferably an angle of around 90°. The first line section and the third line section may also form an angle of between 0° and 360° with each other, preferably an angle of 270°. The second and third line sections may also form an angle of between 0° and 360° with each other, preferably an angle of 180°.

According to a preferred embodiment of the invention, the first line section is floatingly mounted in the first rotational block and/or the second line section is floatingly mounted in the second rotational block and/or the third line section is floatingly mounted in the third rotational block. The floating mounting of the line sections in their respective rotational blocks ensures that thermal expansion of the line sections, the rotational blocks and/or the external lines (or any connecting elements) may be taken up without stress. This makes the distributor unit suitable for use in conjunction with a wide operating temperature range. In particular, it is possible to discharge or divert superheated steam of up to 400° C. internally via the distributor unit.

According to a preferred embodiment of the invention, the distributor unit is configured as a T-piece, the trunk of which forms the first line section and the arms of which form the second line section and the third line section of the distributor unit. This results in a particularly simple and compact design of the distributor unit, namely in the form of three line sections connected to each other at an intersection point. At the intersection of the line sections, which in this case coincides with the intersection of the trunk and the two arms of the letter "T", the individual line sections are fluidically connected to each other. At the point of intersection, the lines or currents routed in the first line section may also be suitably distributed to the second and/or third line section—and vice versa.

According to a preferred embodiment of the invention, at least one line section, preferably all line sections, of the distributor unit is configured as a pipe-in-pipe system with an inner pipe and an outer pipe, wherein an annular gap is formed between the inner pipe and the outer pipe in order to guide a flow and a return of a heating circuit. In particular, both the inner pipe and the outer pipe may be individually floatingly mounted in or on each of the rotational blocks. Alternatively, only the inner or outer pipe may be floatingly mounted in or on the rotational blocks, while the outer or inner pipe is mounted in or on the same rotational block in a different way. It is also possible in principle for the first line section to be floatingly mounted on the first rotational block, for example, only with the inner pipe, for the second line section to be floatingly mounted on the second rotational block, for example, only with the outer pipe, and for the third line section to be floatingly mounted on the third rotational block, for example, only with the inner pipe; all other permutations of this situation are also conceivable. In this way, optimum mounting of the distributor unit on the (connections of the) external lines of the base element, in particular the upright, and/or the first support arm and/or the second support arm may be ensured. The pipe-in-pipe system may also be used to achieve particularly efficient and space-saving routing of two partial flows—such as flow and return—from the support arm(s) to the base element, in particular the upright. The rotational blocks rotatably attached to the end sections of the individual line sections may fulfill an additional function, namely the distribution of the partial flows routed in the pipe-in-pipe system to two or more outlets, which outlets are compatible with the (pipe connections of the) external lines of the base element and/or the support arms (or the support arm). The rotational blocks therefore fulfill an adapter function here and enable the distributor unit according to the invention to be used in conjunction with a wide variety of (line connections of the) external lines, although the pipe-in-pipe system of this variant may always be used.

According to a preferred embodiment of the invention, the first rotational block has means for producing a rigid (non-rotatable, torsionally rigid) connection to the base element, in particular the upright, and/or the second rotational block has means for producing a rigid (non-rotatable, torsionally rigid) connection to the first support arm and/or the third rotational block has means for producing a rigid (non-rotatable, torsionally rigid) connection to the second support arm. For this purpose, individual or all of the rotational blocks may be configured with corresponding connection flanges or correspondingly configured end faces, by means of which a rigid and sealed connection may be established with the respective (line connections of the) external lines of the base element, in particular the upright, the first support arm and/or the second support arm. For example, the end faces are flat and—in addition to the inlets and outlets for the respective lines—have recesses for holding fastening elements, such as screws, which may be used to fasten the (line connections of the) external lines to the respective rotational block.

According to a preferred embodiment of the invention, the first rotational block and/or the second rotational block and/or the third rotational block each have a main seal for sealing the outer pipe and a secondary seal for sealing the inner pipe. This means that the outer pipe and the inner pipe may each protrude into the respective rotational block with different lengths, which has advantages with regard to the design options of the rotational block and the fluidic guides or deflections required in the rotational block, particularly for the flow and return. In addition, this embodiment enables a particularly simple option for floating mounting of the inner and/or outer pipe within the respective rotational block, namely by means of the main and/or secondary seals.

According to a preferred embodiment of the invention, the main seal provides the floating bearing of the outer pipe and/or the secondary seal provides the floating bearing of the inner pipe. This ensures particularly efficient and safe storage of the respective line section in the respective rotational block. Depending on the requirement profile, for example with regard to pressure and/or temperature, the main and secondary seals may each be configured accordingly in order to optimally accommodate and safely store the inner pipe or the outer pipe. For example, main and secondary seals may be made from different materials, which may lead to cost savings.

According to a preferred embodiment of the invention, the main seal comprises a sleeve enclosing the outer pipe at least in sections and preferably a sealing element, in particular an O-ring, arranged at one end of the outer pipe. The sleeve, which may be configured as a Teflon bushing, for example, could completely take over the sealing function of the main seal, provided the tolerances and surface quality are matched to the respective requirements (e.g. with regard to pressure and temperature). The high temperature and the installation preload may cause material changes (shrinkage), which may lead to leaks over time. An additional sealing element, in particular made of elastomer, which may be configured as an O-ring or quad-ring, for example, retains its flexibility for a very long time and possibly even at high temperatures and pressures, which ensures the desired seal for a long time. However, it is also conceivable to configure the (guide) sleeve and the additional sealing element (elastomer seal) in one piece; or the sealing element may be omitted if the sleeve is configured accordingly.

According to a preferred embodiment of the invention, the first rotational block and/or the second rotational block and/or the third rotational block is in each case surrounded by a sheathing bushing, wherein the sheathing bushing is connected to the respective rotational block in a torsionally rigid manner, but is rotatable relative to the respective line section. As the respective sheathing bushing follows the rotational and, if necessary, axial movements of the respective rotational block, the rotational block and the associated sheathing bushing form a unit that performs a relative movement in relation to the respective line section. As no fastening of the sheathing bushing to the respective line section is required, this enables a particularly simple and cost-effective design of the distributor unit according to the invention. In addition, the fixed arrangement of the rotational block and the respective sheathing bushing relative to each other or the fastening of the sheathing bushing to the respective rotational block, preferably by means of a screw connection on the end face, enables the arrangement of further elements, lines and devices in the free space created between the rotational block and the (casing of the) sheathing bushing. Preferably, the diameter of the sheathing bushing is selected so that there is still sufficient space in the base of the sheathing bushing adjacent to or at the end face of the rotational block for openings to feed through lines and/or cables.

According to a preferred embodiment of the invention, the sheathing bushing is fastened, preferably screwed, to the respective rotational block in such a way that the main seal, preferably with a flange of the sleeve, is clamped between the sheathing bushing and the respective rotational block. This makes it particularly easy to fix the position of the main seal within the rotational block and at the same time provides the necessary protection against the push-out forces that occur on the pressure side and act on the main seal during the intended operation of the distributor unit.

According to a preferred embodiment of the invention, means for thermal insulation are arranged between the sheathing bushing and the respective rotational block. This means that the part of the line section running in the respective rotational block and/or the respective rotational block may be thermally insulated in a simple manner, which increases the efficiency of the solar installation.

According to a preferred embodiment of the invention, the first rotational block and/or the second rotational block and/or the third rotational block in each case has a double-flow connection section for fluidic connection of the first rotational block to the base element, in particular upright, and/or of the second rotational block to the first support arm and/or of the third rotational block to the second support arm, wherein preferably the inner pipe guides the return flow and the annular gap guides the forward flow. The respective rotational block diverts the return or flow routed in the inner or outer pipe to two outlets, which outlets emerge in or at the connection section, preferably the connection flange, in order to be fluidically connected to corresponding (connections for the) external lines of the base element, in particular the upright, first support arm and/or second support arm. The main application for distributor units with double-flow connection sections is in the solar generation of saturated steam. The distributor unit of this embodiment may be configured for system pressures of up to 50 bar and, depending on the material selected, for a steam pressure temperature of up to 260° C. without any special effort.

According to a preferred embodiment of the invention, the first rotational block and/or the second rotational block and/or the third rotational block in each case has a triple-flow connection section for fluidic connection of the first rotational block to the base element, in particular upright, and/or of the second rotational block to the first support arm and/or of the third rotational block to the second support arm, wherein preferably the inner pipe guides the forward flow and the annular gap guides the return flow. What has been said about the double-flow connection sections also applies analogously to this embodiment. Embodiments with triple-flow connection sections are particularly suitable for use in solar installations with high volume flows, such as in the case of steam superheating. In a further preferred embodiment of the invention, particularly in the case of large temperature differences between the flow and return, the inner pipe may be double-walled, preferably with a vacuum annular gap, so that a temperature increase in the collectors due to thermal bridges is avoided.

An object of the invention is achieved by a tracking unit for a solar installation, the tracking unit comprising at least one housing with a housing interior, which housing is configured at least to accommodate the distributor unit according to the invention as intended, and preferably also to accommodate further components such as rotary feed-throughs, electrics, slip rings, cables, hoses and/or control unit, in the housing interior, and which housing is formed by at least one support or a support frame and a cover detachably connected to the support frame, as well as at least a first gear for rotation about a vertical axis and a second gear for rotation about a horizontal axis, wherein a gear housing of the first gear is connected to the support frame in a torsionally rigid manner and an output of the first gear is accessible from the outside, in order to be directly or indirectly connected to a base element, in particular upright, and wherein a gear housing of the second gear is connected to the support frame in a torsionally rigid manner and an output of the second gear is accessible from the outside in order to be directly or indirectly connected to a first support arm of the solar installation. In this context, the expression "accommodate as intended" means that the distributor unit or the other components are accommodated in such a way that all connections, in particular fluidic connections, and couplings between the distributor unit or the respective component and peripheral equipment, in particular the external lines of the base element or upright and/or the first support arm and/or the second support arm, may be produced, preferably inside the housing itself. The tracking unit according to the invention is characterized first of all by its independent, modular design and in particular by the housing, which housing is formed by the support frame and the cover detachably connected thereto. Inside the housing, critical elements of the solar installation—i.e. those elements that should be protected from external forces and the effects of the weather in order to minimise the maintenance costs of the solar installation—may be protected, but are still easily accessible by removing the cover. In addition to the associated reduced maintenance effort, the tracking unit according to the invention is also characterized in particular by the two gears (first gear, second gear), which are each mounted directly and non-rotatably on the tracking unit and the output drives of which each point away from the inside of the housing, i.e. are directed outwards. Additional gears, which in solar installations known from the prior art must be provided, for example, on the base element or on the upright, or on one or both of the support arms, are therefore not required; the tracking unit according to the invention does not require any additional gears for biaxial tracking. Motor units, such as worm drives, may be mounted on gear drives.

According to a preferred embodiment of the invention, the first gear and the second gear are each configured as a slewing ring gear. On the one hand, slewing ring gears have the advantage that they have a central opening which, according to the invention, is used to feed through lines or line connections or line flanges in order to establish the necessary connections and couplings between the base element or upright, first and/or second support arm. On the other hand, the advantage over the spindle drives used in the prior art is that no bellows have to be used for sealing, which further reduces the maintenance effort of a solar installation equipped with the tracking unit according to the invention. A further advantage is that the rotary movement is no longer restricted by the use of the slewing ring gears according to the invention, whereas spindle drives allow rotations of at most +/−60°.

According to a preferred embodiment of the invention, the support frame has at least one first feedthrough opening for making connections with the base element, in particular the upright, and a second feedthrough opening for making connections with the first support arm, wherein the first feedthrough opening surrounds the vertical axis and the second feedthrough opening surrounds the horizontal axis. Preferably, the first feedthrough opening is aligned, particularly preferably coaxially, with the central opening of the first gear and/or the second feedthrough opening is aligned, particularly preferably coaxially, with the central opening of the second gear. In this context, aligned means that the feedthrough opening and the central opening overlap at least partially in order to allow lines to pass through. In this context, coaxial means that the (symmetry) axes of the feedthrough opening and centric opening coincide. In particular, the symmetry axis of the first feedthrough opening is the vertical axis and the symmetry axis of the second feedthrough opening is the horizontal axis. In these described embodiments, it is particularly easy to make the necessary connections and couplings between the base element, first support arm and/or second support arm on the one hand and the components arranged inside the housing, in particular the distributor unit, which significantly improves the installation of the tracking unit according to the invention and its user-friendliness.

According to a preferred embodiment of the invention, the support frame has a third feedthrough opening for making connections with the second support arm, wherein the third feedthrough opening surrounds the horizontal axis, preferably the horizontal axis represents the symmetry axis of the third feedthrough opening. The second and third feedthrough openings may therefore be arranged coaxially, in particular centered around the horizontal axis, and on opposite sides of the support frame. The tracking unit according to the invention is thus suitable for use in solar installations with two support arms.

According to a preferred embodiment of the invention, the tracking unit has a swiveling bracket for receiving the first support arm and/or the second support arm, wherein the swiveling bracket in the region of a first passage opening is configured to be connected to the output of the second gear by means of the first support arm, and wherein the swiveling bracket in the region of a second passage opening is configured to receive the second support arm or to be connected to the housing by means of the second support arm, so that the second feedthrough opening of the support frame at least partially overlaps with the first passage opening, preferably is aligned coaxially therewith, and the third feedthrough opening of the support frame overlaps at least in sections with the second passage opening, preferably is aligned coaxially with the latter. Preferably, the horizontal axis forms the axis of symmetry of the first and second passage opening. Accordingly, the swiveling bracket according to the invention enables synchronous rotation of the two support arms (first support arm, second support arm) by actuating the second gear.

According to a preferred embodiment of the invention, the support frame has a bearing block in the region of the third feedthrough opening in order to accommodate a hollow shaft of an intermediate flange, which intermediate flange is arranged between the second support arm and the swiveling bracket in the operating state for connecting the second support arm to the housing. The bearing block may be a separate component that is attached to the support frame using screws, for example, or welded to it. Alternatively, the support frame may be manufactured as a cast part, preferably using the aluminium die-casting process; in this case, the bearing seat for the hollow shaft may be machined directly from the die-cast part or the bearing block and the support frame may be manufactured in one piece. The bearing block according to the invention enables a particularly stable mounting of the second support arm on the housing and thus increases the operational reliability of a solar installation equipped with the tracking unit according to the invention.

According to a preferred embodiment of the invention, the bearing bracket has a rotary seal to seal the housing in the area of the contacting of the swiveling bracket. This further reduces the maintenance effort of the tracking unit according to the invention and corresponding solar installations equipped with it. The components inside the housing, especially the distributor unit, may thus be protected even more reliably against wear, damage and soiling.

According to a preferred embodiment of the invention, the distributor unit according to one of the embodiments described above is accommodated in the interior of the housing. Preferably, the distributor unit is mounted in the interior of the housing with its axis centered in relation to the vertical axis and the horizontal axis. Thus, the tracking unit according to the invention has all of the advantages described above in conjunction with the distributor unit. In particular, the tracking unit of this embodiment allows all fluidic and possibly electrical connections to be made particularly easily and quickly, as only the corresponding (connections of the) external lines of the base element or upright, the first support arm and/or the second support arm need to be connected to the corresponding rotational blocks for this purpose. This means that it is no longer necessary to first position various hoses, lines and cables accordingly and then connect them individually; instead, all connections and couplings may be made in a single work step using plug-in connections, for example. For example, all supply and return lines of the base element or upright may be fluidically connected to the corresponding lines of the tracking unit by coupling the connecting section or flange of the first rotational block to the corresponding connection (flange) of the base element or upright; the same applies to the first support arm and the second rotational block, and the second support arm and the third rotational block.

According to a preferred embodiment of the invention, a cleaning device is arranged inside the housing, which cleaning device has means for supplying cleaning agent to the first support arm and/or the second support arm. In other words: The tracking unit has a device inside the housing for distributing or forwarding cleaning water supplied from the base element or upright into the pipes provided for this purpose in the two support arms. This further reduces the maintenance effort for the tracking unit or a solar installation equipped with it.

According to a preferred embodiment of the invention, the means for supplying cleaning agent supply lines comprise at least one flexible hose, at least one rotatable hose connection and/or at least one rotary feedthrough, wherein preferably the rotary feedthrough is mounted on the end face of the sheathing bushing of the first rotational block and a pipe socket of the rotary feedthrough extends between the first rotational block and its sheathing bushing and is guided through an opening in the end face base of this sheathing bushing in order to enable a fluidic connection of the cleaning device to a corresponding connection of the base element, in particular the upright. This creates a cleaning device or device for distributing the cleaning water supplied from the upright into the lines of the two support arms, which is mounted in a particularly stable and space-saving manner, but may be connected to the corresponding connections of the base element or the upright in a particularly simple and reliable way.

According to a preferred embodiment of the invention, a rotary housing is mounted on an outer side of the sheathing bushing of the first rotational block, the second rotational block and/or the third rotational block, wherein the rotary housing is preferably fixed to the support frame, and wherein the rotary housing accommodates slip rings and sliding contacts and/or flexible cable harnesses, in particular for supplying a distributor box and/or a photovoltaic system. This makes it possible to accommodate electrical components in a particularly space-saving and function-optimised manner. The arrangement of the rotary housing on the outside of the sheathing bushing, which is preferably cylindrical, ensures a stable bearing but does not come into contact with any other components, such as the cleaning device, or disrupt its operation. In addition, the proximity to the support frame enables the rotary housing to be reliably fixed in position.

According to a preferred embodiment of the invention, a distributor box with one or more connections, preferably plug-in connections, is arranged inside the housing, which distributor box is preferably attached to the support frame and/or clamped between two parts of the rotary housing. This means that all electrical connections for the operation of the solar installation may be made in a protected environment, namely inside the housing, and all components of the solar installation or tracking unit may be supplied with electricity.

According to a preferred embodiment of the invention, an electronic control unit with connections for units, in particular motors of the gears and/or sensors, is arranged inside the housing, which control unit is preferably electrically connected to the distributor box via one or more connections, in particular plug-in connections. In this embodiment, the control unit is also housed in the protected interior of the housing; since the main electrical components, in particular motors and sensors, are also located in or on the tracking unit—and not on the base element or upright or the support arms—they do not perform any movements relative to the control unit during the biaxial tracking movements. This means that comparatively less flexible but all the more stable cabling may be used to connect these components to the control unit; at the same time, the required cable lengths may be reduced to an absolute minimum.

According to a preferred embodiment of the invention, one or more sensors are arranged inside the housing and preferably fixed in position on the support frame, which sensors are set up to read angle information via angle-coded rings, which are attached to the sheathing bushings of the first rotational block, the second rotational block and/or the third rotational block, and forward it to the control unit. In this way, particularly reliable tracking or control of the solar installation's tracking movements may be ensured. In particular, this embodiment utilises the fact that the sheathing bushings are non-rotatably connected to the respective rotational blocks of the distributor unit, and these rotational blocks are in turn non-rotatably connected to the (connections of the) external lines of the base element or upright, first support arm and/or second support arm in the operating state. This means that the rotational position of the sheathing bushing always corresponds to the current rotational position of the respective base element, upright or support arm. Alternatively, the sheathing bushing itself could be angle-coded and the angle-coded ring omitted.

An object of the invention is achieved by a solar installation comprising at least one tracking unit equipped with a distributor unit according to the invention in accordance with one of the embodiments described above, a base element, in particular an upright, and at least one first support arm with at least one solar collector, in particular a mirror-reflecting solar collector, and/or solar cells attached thereto, characterized in that the first rotational block is fluidically connected in a sealing and torsionally rigid manner to lines of the base element, in particular of the upright, and the second rotational block is fluidically connected in a torsionally rigid and preferably sealing manner to lines of the first support arm. In this way, a solar installation is provided that has all the advantages described in relation to the distributor unit and the tracking unit. In particular, the solar installation is characterized by extremely low maintenance requirements, as hydraulic or steam lines are routed within the base element or upright and within the support arm and are redirected and divided by means of the distributor unit, which is housed in the tracking unit in a protected manner. These pipes may therefore be routed to the solar collectors and/or cells of the solar installation protected from all external influences.

According to a preferred embodiment of the invention, the solar installation comprises a second support arm with at least one solar collector attached thereto, in particular at least one mirror-reflecting solar collector, and/or at least one solar cell attached thereto, wherein the third rotational block is fluidically connected to lines of the second support arm in a torsionally rigid and preferably sealing manner. This creates a solar installation with two support arms, both of which may be rotated around the horizontal axis in the manner described in order to track the solar collectors and/or cells with regard to the solar altitude. The swiveling bracket according to the invention allows both support arms to be moved synchronously and securely mounted on the housing of the tracking unit. A particularly reliable sealing of the tracking unit or the interior of the housing at transitions to the support arms may be achieved on the one hand by at least one rotary seal and on the other hand by at least one rotary seal of the bearing block.

According to a preferred embodiment of the invention, in the case of double-flow rotational blocks, the fluidic connection is established by means of double-flow mating flanges of the base element, in particular upright, the first support arm and/or the second support arm, which mating flanges are fastened to the connecting sections of the rotational blocks, preferably in an axis-centered, particularly preferably exactly axis-centered manner, in particular screwed or welded, wherein the mating flanges are preferably fixed via insulating jaws to the base element, particularly the upright, the first support arm and/or the second support arm, or are formed in one piece therewith. In the case of double-flow connection flanges or end faces of the rotational blocks, double-flow mating flanges enable a particularly simple and time-saving fluidic connection to be established between the line sections of the distributor unit on the one hand and the external lines of the base element or upright, the first support arm and/or the second support arm on the other. At the same time, flange connections, i.e. the connection of the connecting flanges with the respective mating flanges, enable a particularly tight fluidic connection. The insulating jaws enable thermal insulation of the mating flanges from the external lines of the base element or upright, the first support arm and/or the second support arm. The mating flanges are particularly preferably attached to the connecting sections of the rotational blocks via sealing elements, in particular screwed.

According to a preferred embodiment of the invention, in the case of triple-flow rotational blocks, the fluidic connection is established by means of triple-flow mating flanges of the base element, in particular the upright, the first support arm and/or the second support arm, which mating flanges are attached to the connecting sections of the rotational blocks, wherein preferably the mating flanges are each rigidly connected to an intermediate plate via two external return lines and the intermediate plates are each fastened via insulating sleeves to receptacles of the base element, in particular upright, the first support arm and/or the second support arm, which receptacles in particular have guides for a contactless feedthrough of the two external return lines and an internal supply line. This means that the advantages described in conjunction with double-flow mating flanges may also be achieved with triple-flow mating flanges. In particular, thermal insulation may be achieved by avoiding contact between the intermediate plate and the internal supply line of the base element or upright, the first support arm and/or the second support arm on the one hand, and by attaching the intermediate plate to the respective holder using insulating sleeves on the other. The contactless routing of the flow and return lines in the base element or upright, first support arm and/or second support arm also contributes to the thermal insulation of the solar installation and increases its efficiency.

According to a preferred embodiment of the invention, the, in particular thermal, hydraulic or steam-conducting, lines of the base element, in particular the upright, the first support arm and/or the second support arm are sealingly connected, in particular welded, to the mating flanges. The connection may be achieved, for example, via screw connections between connecting flanges or end faces of the rotational blocks on the one hand and the mating flanges on the other. This further increases efficiency and reduces maintenance even further.

According to a preferred embodiment of the invention, the base element, in particular the upright, is connected to the output of the first gear, the first support arm is connected to the swiveling bracket and to the output of the second gear in the region of the first passage opening of the swiveling bracket, and the second support arm is connected to the swiveling bracket and the housing in the region of the second passage opening of the swiveling bracket, preferably with the intermediate flange in between. This provides structural support for the base element or upright, first and/or second support arm on the tracking unit. The special choice of fastening on the gear outputs and on the swiveling bracket ensures that tracking is particularly efficient and that the solar installation may be operated with as little maintenance as possible.

The present invention relates to a distributor unit and to a tracking unit for solar installations with solar collectors, in particular for mirror-concentrating collectors, and/or solar cells, which enable biaxial tracking of the solar installation. The tracking unit may be supplied as a ready-to-deliver compact unit for a wide variety of connection peripherals. Slewing ring gears may be used for both axes of rotation. The centerpiece is the distributor unit according to the invention, which may be arranged at the intersection of the two axes of rotation for azimuth (vertical axis) and solar altitude (horizontal axis) in the tracking unit. Depending on the dimensioning of the flow cross-sections of the line sections of the distributor unit, which line sections are fluidically connected to each other, it is possible to feed wet steam, superheated steam and/or condensate to and from the solar collectors via the distributor unit along the axes of rotation. It is possible to provide the tracking unit modularly with electrical components or devices, which components conduct the current from PV collectors (e.g. cooled photovoltaic systems) via lines of the tracking unit along the two axes of rotation. Components or devices for the diversion and distribution of cleaning water or cleaning agent, which is fed to the collectors, may also be provided on a modular basis in the tracking unit. All of these hydraulic and electrical devices may perform the rotary movements around the two rotary or tracking axes in a closed interior of the tracking unit; in other words, these components and devices do not change their relative positions relative to the tracking unit in the course of the tracking movements. The control unit of the solar installation and the sensors may also be arranged in this interior of the tracking unit, i.e. inside the housing, so that as few cable harnesses as possible need to be laid to and from a collector system. According to the invention, all essential technical components, preferably all critical components, are accommodated in an interior space formed by the interior of the housing, which interior space is created by a simple cover which is detachably connected to the support frame. The tracking unit has at least two, but preferably three flange mounts (or mounting flanges), namely a flange mount centered around the vertical axis for the base element, which base element may be formed by a mast or upright, and two further flange mounts centered around the horizontal axis for the support or holding arms. All lines may be laid inside the load-bearing pipes or structures (namely the base element or upright, first support arm and second support arm) and embedded in insulating compound. In principle, the distributor unit allows rotary movements at any angle. The rotation range around the horizontal axis may be limited to 180°, for example, to prevent collisions with other parts of the solar installation. However, any rotation around the vertical axis (all-round movement) is possible.

Flexible cables and hoses may restrict movement. As shown, the 180° rotation in the horizontal axis may also be achieved with flexible cables and hoses. The support arms may be swiveled into a special protective position so that the irradiation surfaces are directed downwards, towards the ground or substrate, whether with mirror-concentrating collectors, flat-plate collectors or solar cells.

A rotation option of up to 270° (+/−) 135° around the vertical axis is sufficient for azimuth adjustment or tracking in a wide latitude range (~23° to ~53°). This may still be achieved with flexible cables and hoses. If unrestricted rotation in azimuth is required, a variant with slip ring contacts is available for the electrical system. There is also a special version with a rotary feedthrough for the supply of cleaning water. Solar installations of this variant may rotate around the vertical axis as required and be brought into the starting and/or protective position by the shortest route. At extreme latitudes (e.g. near the Arctic Circle, but also near the equator within +/−23°), it may be necessary to configure the systems for all-round movement.

All electrical lines for sensors, the control unit and the drives may be quickly connected, preferably via plug contacts, to the distributor box, which is also protected in the tracking unit. The invention relates in particular to the gear structure and the step-by-step modular expansion with all other technical components.

The aim of this development is to provide a ready-to-connect unit (tracking unit) for all incoming and external lines, which are permanently installed in the support arms and the upright and insulated if necessary. Among other things, this makes it possible to configure the solar installation according to the invention without external cables and lines (apart from cables that run from the inside of the housing of the tracking unit to the motors of the gears (first and second gears) and cables that may run from the support arms (first and second support arms) to the solar collectors and/or cells). The distributor unit may be housed inside the tracking unit with thermal insulation. This means that with appropriate insulation of the solar installation, if necessary with minimal heating, freezing of the solar installation or its components may be prevented, preferably without the addition of antifreeze. This is particularly the case with mirror concentrating collectors with vacuum technology, which have very low heat radiation.

According to the invention, the tracking unit is characterized, among other things, by the fact that a support frame with three flange mounts is provided, which flange mounts may be arranged surrounding the feedthrough openings, namely a first flange mount for receiving the first gear unit for rotation about the vertical axis, a second flange mount for receiving a gear unit for rotation about the horizontal axis and a third flange mount for receiving a bearing block, which bearing block is arranged in alignment with the horizontal axis. The feedthrough openings, i.e. sufficiently large openings for the feedthrough of connections, couplings, connecting flanges, mating flanges, lines and cables, may be provided in the center of the (pitch circles to the) flange holders. The gears are mounted on the tracking unit so that they are unable to rotate and are orientated outwards on the output side. The gear body or housing and (indirectly) the motor unit connected or connectable to the drive of the respective gear are rigidly connected to the support frame or housing of the tracking unit. A solid swiveling bracket with two flange mounts, each of which may be arranged around one of the two passage openings, is provided to hold the support arms. The fixed bearing is located on the output flange of the second gear and the floating bearing on the bearing block. The two flange mounts of the swiveling bracket each have a sufficiently large passage opening for the installation or feedthrough of hydraulic and electrical lines as well as connections, couplings, connection flanges, mating flanges and cables. The flange mount arranged on the second gear is located between the output flange of the second gear and the first support arm. A cover is detachably mounted to the support frame so that all technical components (but in any case the distributor unit and any rotary feedthroughs, electrics, slip rings, control unit and the distributor box) are housed in a closed and sealed space, the inside of the housing.

The gears may preferably be configured as slewing rings or slewing ring gears which have centered openings (centric openings) in relation to the respective axis of rotation (vertical or horizontal axis), which openings allow the routing or feedthrough of hydraulic and electrical lines as well as connections, couplings, connecting flanges, mating flanges and cables. The power reduction may preferably be realised by a worm drive. The gears are preferably equipped with rotary seals and are therefore virtually maintenance-free. A further reduction with planetary sets or a further worm drive may be provided in the motor unit. In contrast to the usual prior art, the first gear for the rotation around the azimuth axis is permanently mounted on the tracking unit so that its output is directed downwards. Also new in relation to the prior art is the use of a slewing ring gear for height adjustment (solar altitude). Compared to the generally used spindle drives, the advantage is that no bellows have to be used for sealing, which enables maintenance-free operation. Another advantage is that the rotary movement is no longer restricted, whereas spindle drives allow a maximum rotation of around +/−60°. The motor units are also easy to access and maintain from the outside. This has advantages in terms of the operational reliability of the solar installation. If a motor or motor unit is defective, the solar collectors or cells may remain in an unfavourable position (due to weather conditions). After dismantling the motor unit, the gear may be operated using a hand crank. This means that the collector system may be brought into the protective position manually. For industrial systems with a large number of collector units, it makes sense to keep at least one motor unit in stock so that a defective system may be put back into operation immediately.

The free-running bearing of the swiveling bracket is a floating bearing. The bearing block is attached to the support frame or is part of the support frame. The bearing shaft is an insertion tube that is fixed to the swiveling bracket or protrudes through the second passage opening of the swiveling bracket into the bearing of the bearing block. The swiveling bracket is preferably secured for transport on the floating bearing side on the sealing ring between the swiveling bracket and bearing block and on the drive side on the output flange of the second gear. The swiveling bracket is only fixed in place by frictional engagement when the two support arms are mounted. For delivery, however, it is sufficient to provide dowel pins with a slight press fit and/or additional fixing with countersunk screws. The support arms may be installed in the exact axis-centered position using the dowel pins. Further details on the design and assembly may be found in the figure description.

The distributor unit, comprising a T-shaped tube-in-tube system forming an annular gap and further comprising three rotational blocks, may be positioned at the intersection of the two axes of rotation. This directs the flow and return flow via the rotational blocks (first, second, third rotational block) to the collectors and back from the collectors. The rotational blocks may be slid over the tube-in-tube system and (in relation to the vertical and horizontal axis) connected to the upright and the two support arms flush with the axis via connecting or sealing flanges. The rotational blocks rotate with the output of the respective gear (first rotational block with the first gear, second and third rotational block with the second gear). This leads to a relative rotation of the rotational blocks to the line sections of the distributor unit or to the support frame. The T-shaped tube-in-tube system may be mounted floating in or on the rotational blocks so that this tube-in-tube system does not change its position relative to the support frame or housing of the tracking unit. The rotational blocks are held axially displaceably (floatingly mounted) on the seals so that thermal expansions may be taken up, in particular without stress. The rotational blocks have connection sections (connection flanges, flange mounts), which preferably do not protrude from the inside of the housing, thus enabling collision-free removal and installation of the distributor unit. The corresponding mating flanges of the base element or the upright and the two support arms are fixed to the respective base element, in particular the upright, and/or the first support arm and/or the second support arm or to their pipe holders or guides via insulating blocks, so that the heat flow from the hot pipes via the mating flanges is largely prevented. The rotational blocks themselves are thermally insulated and have only minimal thermal bridges across the mating flanges due to the insulating blocks. To avoid damaging distortions, it is important that the distributor unit is installed exactly flush with the center line and that the distributor unit and tracking unit are connected to the other parts of the solar installation, in particular the base element and support arm(s). This may be achieved by mounting the support arms and the base element precisely or centered on the axis using dowel pins on the flange mounts of the tracking unit.

The distributor unit may be configured with two or three flows, for example. The connection sections (flange mounts) of the rotational blocks, the seals used for sealing and the mating flanges of the support arms and the base element or upright differ accordingly. The tracking units may be modularly equipped and/or retrofitted with additional components, wherein the additional components are preferably fully accommodated inside the housing. This means that there are no collisions in any assembly and the connection dimensions of the tracking unit are suitable for different installations or connection peripherals. Both of the variants described in greater detail below are dealt with in greater detail in the figure description.

Variant A—double-flow connection: The main application for double-flow connections is the solar generation of saturated steam. The rotational blocks have a flow and a return connection. The flow through the inner T-shaped branch pipe is outwards from the collector (return flow in heating terms), while the flow through the annular gap between the inner and outer pipes is inwards from the collector (forward flow in heating terms). If we consider collectors with direct evaporation, the amount of condensate that is brought to the collectors is very small. This may be explained by the extremely high evaporation energy in the lower wet steam range. The main use of the distributor unit will be for such systems with direct vaporisation. The condensate line therefore has a small flow cross-section. The effect of the thermal bridge between condensate and saturated steam is negligible. There is a main and a secondary seal in each of the rotational blocks. The main seal may consist of a heat-resistant guide sleeve (e.g. made of Teflon) and an inserted soft seal (e.g. made of Viton, polyether ether ketone (PEEK) or Peak), which is positioned between the rotational block and the outer pipe of the T-piece. The system pressure must be sealed with respect to the external pressure. The secondary seal seals the inner pipe against the annular gap and is therefore under system pressure on both sides. This means that only the pressure loss from and to the collectors is relevant for sealing. A sleeve made of Teflon, polyether ether ketone (PEEK) or Peak is also recommended here between the inner pipe of the T-piece and the rotational block. The distributor unit may be configured for system pressures of up to 50 bar and, depending on the material selected, for a steam pressure temperature of up to 260° C. without any special effort.

Variant B—Triple-flow connection: Triple-flow connections are provided when high volume flows are present, such as in the case of steam superheating. The rotational blocks have one flow connection and two return connections. The flow through the inner T-shaped branch pipe is inwards from the collector (forward flow in heating terms), while the flow through the annular gap between the inner and outer pipes is outwards from the collector (return flow in heating terms). The flow is reversed compared to variant 1. The sealing structure is the same as for the double-flow distributor unit, only with different cross-sectional dimensions. System pressures of up to 50 bar may also be operated here. Overheating the steam to high temperatures above 400° C. is not a problem, as the main seal in the temperature of the saturated steam (return) is at a maximum of 260° C. The secondary seal, on the other hand, is in the high temperature range. A metallic or ceramic seal is recommended for this purpose. In the simplest case, a snug fit without a sealing sleeve is sufficient. A small leakage may be accepted as the volume expansion of the steam is very high, resulting in a negligible mass flow leakage due to a flow short circuit. As the temperature difference between the flow and return may be relatively high, it is advisable to configure the inner pipe with double walls (e.g. with a vacuum ring gap) so that a temperature increase in the collectors due to thermal bridges is avoided.

The main use for the generation of heated steam is electricity generation. Generating superheated steam in two separate stages, vaporisation and superheating, has the advantage that the heat may be transferred more easily to the station for conversion into electricity. Depending on the process pressure (15-50 bar), the proportion of heat for superheating is 10% to 20%. This means that every tenth to fifth collector tree in larger systems is configured for steam superheating. The advantage of the separation of tasks lies in the introduction of heat. This means that the high-temperature collectors may be installed as close as possible to the station with short pipe lengths. High process temperatures make sense, as the output of peripheral connection devices for generating electricity or cooling increases with the temperature. When generating saturated steam, the heat losses in the pipes do not necessarily increase with high process temperatures, as increased system pressures also prevail at higher temperatures. As the pressure increases, the specific volume of the steam decreases, which in turn allows the pipe cross-sections to be dimensioned smaller. This reduces the heat-emitting surfaces. Small pipe cross-sections also reduce the heat capacity of the system, which reduces the energy required to heat the system. Seamless insulation and the avoidance of thermal bridges are important. The rotational blocks may be encased in a cylindrical shape. The gap may be filled with insulating material. The pot-shaped casing may be mounted on the front of the rotational blocks. This assembly may also fix the main seals (guide sleeves) of the rotational blocks, which would otherwise be pushed out by the system pressure. Depending on the system pressure, the thrust force may be up to 75 kg. Further details are shown in the figures in the figure description.

Intermittent or regular cleaning of the collectors is important to maintain high performance and protect the mirrors. An automatic cleaning system makes sense for industrial facilities, as the cost of labour for regular cleaning may become relatively high over the years. A device for branching the cleaning water, which is channeled via the two rotary axes (vertical and horizontal axis), is now optionally available for automatic cleaning. This is a modular assembly according to customer requirements; the cleaning device may also be retrofitted. In this case, modular means that all components may be installed in different configurations without collision and in a functional manner—even retrospectively in the sense of retrofitting.

Depending on whether a limited or an arbitrary rotation around the azimuth axis (vertical axis) is desired or required, there are two variants for the passage of the cleaning water via the azimuth axis:

Cleaning variant A—restricted movement: When mounted on the upright, the pipe socket of the upright for cleaning protrudes into the inside of the housing or the space between a base plate of the support frame and the first rotational block. There is enough space to fit a hose connection to this pipe socket. In order to keep the bending movements of the hose as moderate as possible, it is advisable to provide twistable connections. These take up little space. The swivel connections for such pipe sockets or cleaning devices may be eccentric to the axis of rotation of the respective gear—in this case eccentric to the vertical axis. The hoses connected at such swivel connections must still bend during the rotation that occurs during tracking, but may do so in a much larger radius. Another advantage of this system is that the hydraulic system of the solar installation does not have to be opened during maintenance or dismantling due to a leak in the cleaning device. Operation may continue.

Cleaning variant B—any rotation: If the system is configured to be able to rotate about the azimuth axis (vertical axis) as required, a rotary feedthrough may be provided for the cleaning water. Installation space is provided above the first turning block (vertical turning block), for example. This rotary feedthrough may have a connection piece for a hose connection on the outflow side and a pipe socket on the inflow side, preferably with a flange connection, which is inserted between the rotational block and the casing bushing. Further details regarding installation and design are presented in the figure description.

Electrics: According to the invention, a control unit may be installed inside the housing of the tracking unit. The sensor system for detecting the angular position of the first and/or second support arm and/or the base element may also be located inside the housing of the tracking unit. The end positions may also be defined via the angle measurement so that no separate limit switches are required. The angle take-off may occur at the rotational blocks, which move relative to the gear housing. As the control unit may be housed in the protected interior, the cables from the control unit to the two motor units or motors of the tracking unit may be laid rigidly and over the shortest possible distance. The motor units or motors only require the signals for operation (e.g. plus and minus) from the control unit. A wind sensor, which may be attached to the tracking unit, in particular to the housing of the tracking unit, may also be wired rigidly, as it rotates with the support frame of the tracking unit and thus with the control unit—in other words: An attachment of the wind sensor does not move relative to the housing of the tracking unit. The sensor for fine calibration of the tracking to the position of the sun rotates in the horizontal axis relative to the inside of the housing. A flexible cable must be provided for its connection to the control unit. The electrical lines for the motor units or motors, which are operatively connected or may be connected to the drives of the gears, the wind sensor and/or the sensor for fine calibration of the tracking system are inserted into the interior of the housing, in particular in a sealed manner. A tubular cover, referred to here as a rotary housing, may be pushed onto the casing bushing of the first rotational block (vertical block), which rotary housing forms an annular gap. The rotary housing may be configured in two parts so that disassembly for maintenance work is possible without opening the hydraulic circuit. The rotary housing may be fixed (non-rotatably) to the support frame and centered by the sheathing bushing. An insulating block on the outside or a distributor box with plug contacts may be attached at the same time as the rotary housing is fixed. The control unit may be plugged in here. The electrical system may be routed around the axis of rotation in the annular gap inside the rotary housing using slip rings or flexible cable harnesses. Depending on whether slip rings or flexible cable harnesses are provided, the outer insulating block or the distributor box has a spring-loaded slip ring pick-up or tangential outgoing cable harnesses. The cable harnesses may wind and unwind geometrically along precisely defined paths in the annular gap during rotational movements according to the clockspring principle, as is also common in steering systems in the automotive sector. Depending on the design, the electrical lines may be connected to an internal insulating block or distributor box with slip rings or tangentially extending cable harnesses via a recess in the sheathing. Further details on the installation of the electrics are given in the figure description. The electrical system may be connected to the wiring harness from the upright via a multiple connector. Cooled photovoltaics (PV), especially for concentrator systems, is playing an increasingly important role in connection with renewable energies. A mounting area may be kept free in the rotating housing to install the additional electrics for the PV power. Flexible line ties or slip rings are also used here. Further details may be found in the figure description.

BRIEF DESCRIPTION OF THE DRAWINGS

Preferred embodiments of the invention are described in more detail below with reference to the drawings. These embodiments are intended to describe the idea of the invention in more detail, but are by no means intended to limit or even finalise it. In the drawings.

DETAILED DESCRIPTION

Figure 1:
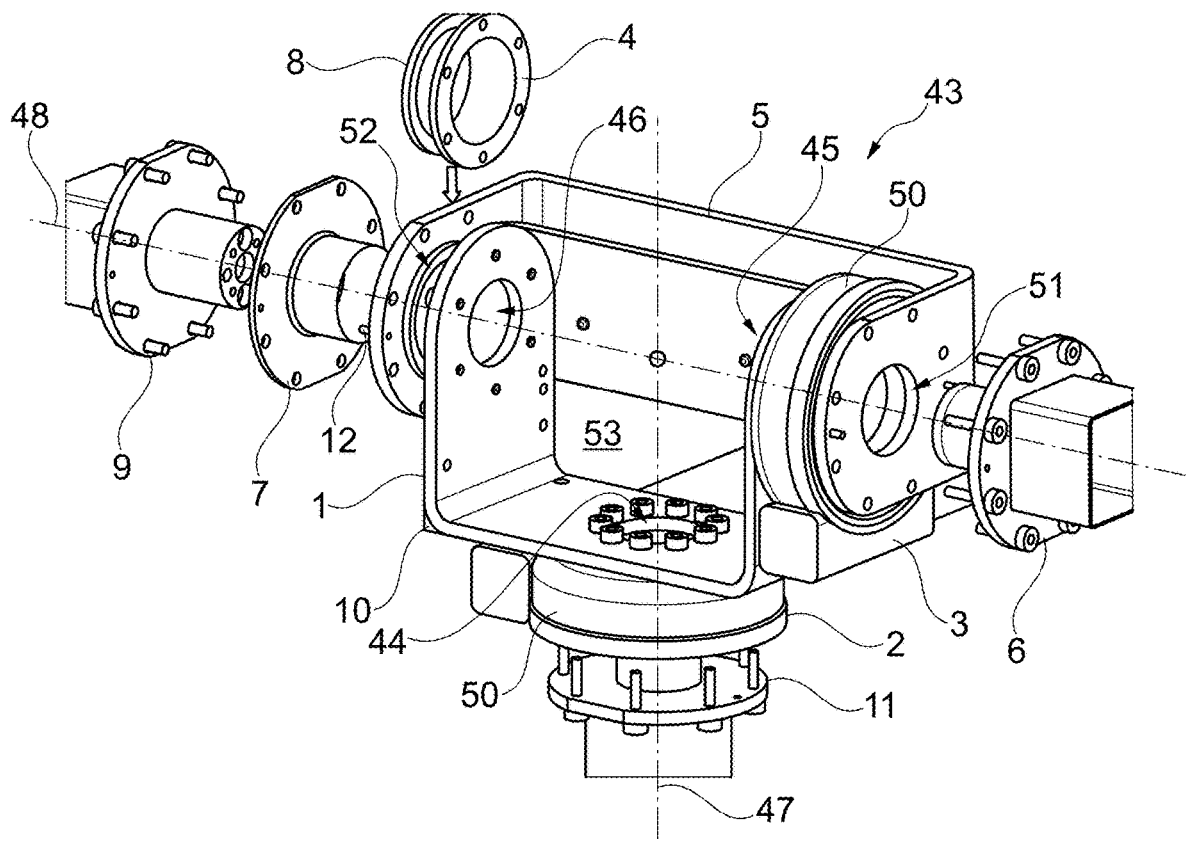
FIG. 1 shows a schematic view of a first variant of the tracking unit according to the invention in an exploded view.

FIG. 1 shows a schematic view of a first variant of the tracking unit 43 according to the invention in an exploded view. The tracking unit 43 is characterized by the fact that a support frame 1 with three flange mounts is provided, which flange mounts are arranged around a first feedthrough opening 44, a second feedthrough opening 45 and a third feedthrough opening 46. The first flange mount in the region of the first feedthrough opening 44 serves to receive a first gear 2 for rotation about a vertical axis 47; the second flange mount in the region of the second feedthrough opening 45 serves to receive a second gear 3 for rotation about a horizontal axis 48; and the third flange mount in the region of the third feedthrough opening 46 serves to receive a bearing block 4, which bearing block 4 is arranged in alignment or centered on the horizontal axis 48. The three feedthrough openings 44, 45, 46 are intended for feeding through the lines and cables. The gears 2, 3 are orientated outwards on the output side, i.e. their respective outputs are accessible from the outside. The gear body or gear housing 50 and motor units 49 (see FIG. 13) are rigidly connected to the support frame 1. A solid swiveling bracket 5 with two flange mounts is provided to accommodate a first support arm 6 (and possibly a second support arm 9). The fixed bearing is located on the output flange of the second gear 3 and the floating bearing on the bearing block 4. The two flange mounts of the swiveling bracket 5 each surround a passage opening, namely a first passage opening 51 and a second passage opening 52, for the laying or feedthrough of hydraulic and possibly electrical lines. The flange mount of the swiveling bracket 5 arranged around the first passage opening 51 is embedded (sandwiched) in the operating state between a flange of the output of the second gear 3 and a flange of the first support arm 6. The swiveling bracket 5 is fixed to the floating bearing by an intermediate flange 7 with a hollow shaft. The hollow shaft forms the rotatable inner bearing to the bearing block 4. For transport, it is sufficient to fix the swiveling bracket 5 with dowel pins 12. The swiveling bracket 5 is held to the bearing block 4 by a rotary seal 8. A frictionally engaged fixation is only achieved when the support arms 6, 9 are fitted. The support arms 6, 9 and a base element of the solar array configured as an upright 11 are precisely centered in relation to the vertical or horizontal axis using the alignment pins 12. A cover (not shown) is mounted over the support frame 1 so that technical components (e.g. distributor unit, rotary feedthrough, electrics, slip rings, flexible cables, hoses, control unit) may be accommodated in a closed and sealed space, namely a housing interior 53.

Figure 2:
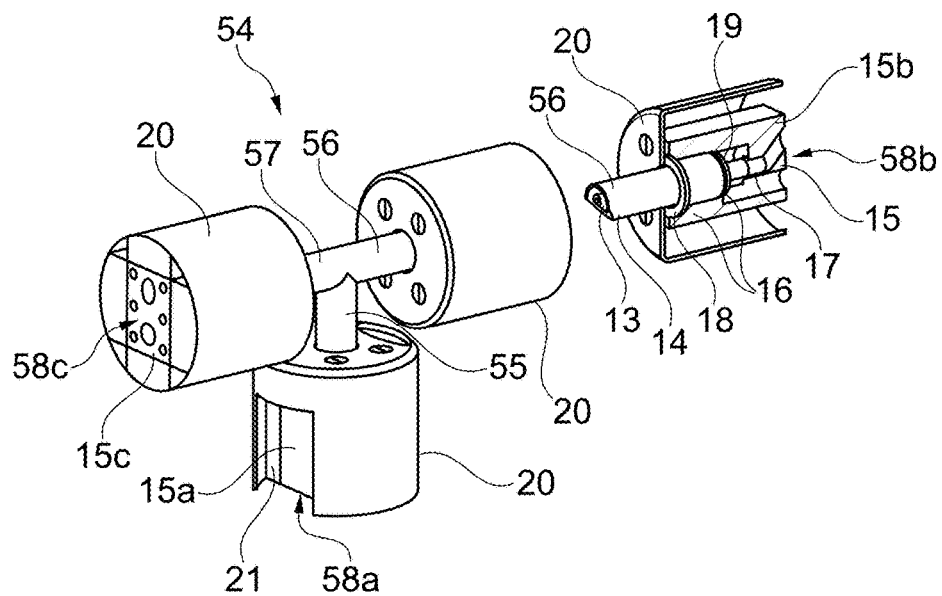
FIG. 2 shows a schematic representation of a first variant of the distributor unit according to the invention with a detailed view of the second rotational block in a sectional view.

FIG. 2 shows a distributor unit 54 for a double-flow connection. The distributor unit 54 comprises a first line section 55 with a first rotational block 15a, a second line section 56 with a second rotational block 15b and a third line section 57 with a third rotational block 15c. The sectional view shows the internal structure of the line sections 55, 56, 57, which are fluidically connected to each other at the intersection, namely a pipe-in-pipe system with an inner pipe 13 and an outer pipe 14. The outer pipe 14 of the respective line section, in this case the second line section 56, is mounted on a main seal 16 floating over the respective rotational block, in this case in the second rotational block 15b. The inner pipe 13 of the respective line section, in this case the second line section 56, is also mounted in a floating manner on a secondary seal 17 via the respective rotational block, in this case in the second rotational block 15b. As shown here, the main seal 16 may consist of a (guide) sleeve 18 and an O-ring 19. A sleeve bushing 20 of the second rotational block 15b is screwed to the end face of the rotational block 15b and presses against the extension force of the guide sleeve 18. A thermal insulation 21 of the first rotational block 15a may also be seen, but this thermal insulation may be provided in several or all rotational blocks 15a, 15b, 15c in order to achieve thermal insulation of the respective line section 55, 56, 57.

Figure 3:
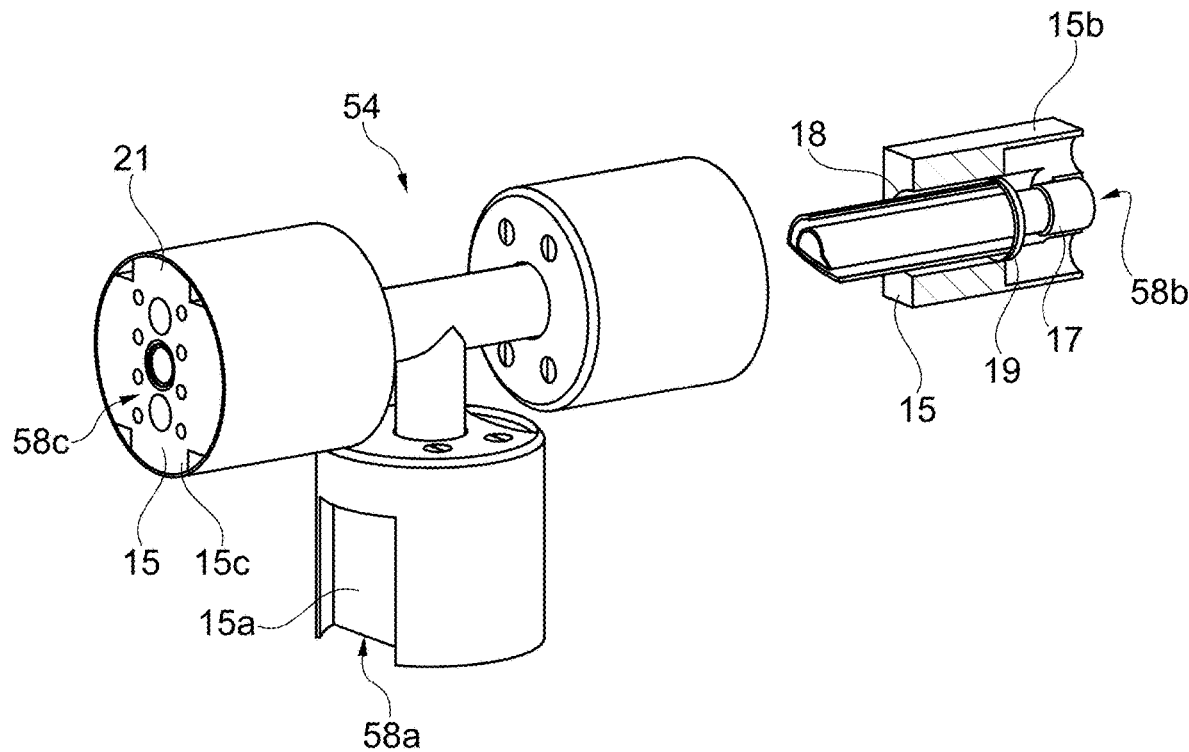
FIG. 3 shows a schematic representation of a second variant of the distributor unit according to the invention with a detailed view of the second rotational block in a sectional view.
Figure 4:
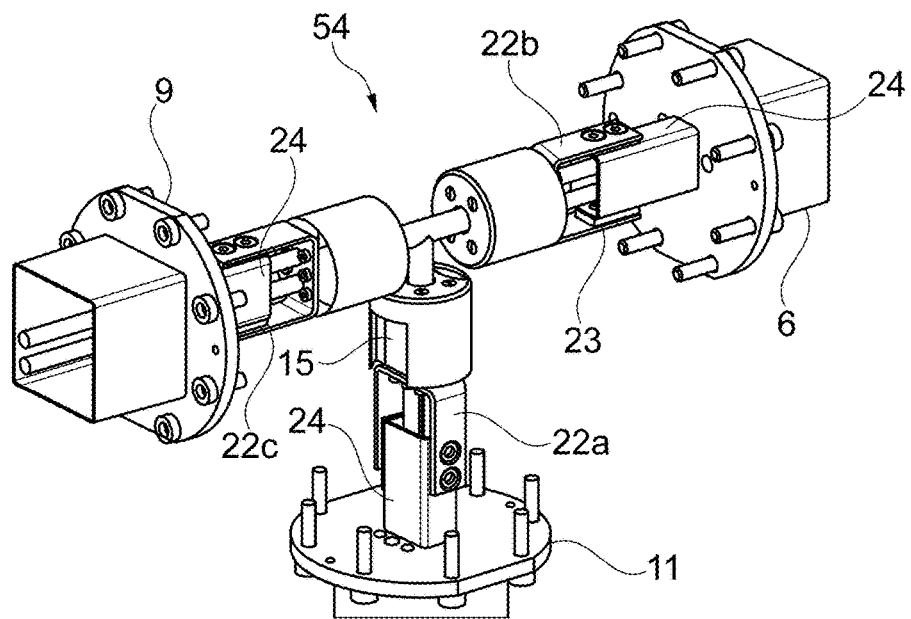
FIG. 4 shows the first variant of the distributor unit according to the invention with fluidic connections produced.

FIG. 3 shows a distributor unit 54 for a triple-flow connection. The basic design is the same as for the double-flow distributor unit 54 (FIG. 2), but with different cross-sectional dimensions if necessary. The rotational blocks 15a, 15b, 15c are dimensioned or configured in such a way that the flows conducted in the inner pipe 13 and in the outer pipe 14 are divided into three partial flows, which partial flows correspond to the inlets and outlets opening out in the respective connection section (visible in the end face of the third rotational block 15c in FIG. 3). FIG. 4 shows the double-flow distributor unit 54 in the assembly or with fluidic connections made with external (thermal) lines of the upright 11, the first support arm 6 and the second support arm 9. The distributor unit 54 is centrally mounted on the connection sections 58a, 58b, 58c (flange mounts) of the rotational blocks 15a, 15b, 15c. Double-flow mating flanges 22a, 22b, 22c are fork-shaped and attached to square tubes 24 via insulating jaws 23, which are permanently connected to the support arms 6, 9 and the upright 11 or are formed in one piece therewith. The thermal lines of the support arms 6, 9 and the upright 11 are welded or sealingly connected to the respective mating flange 22.

Figure 5:
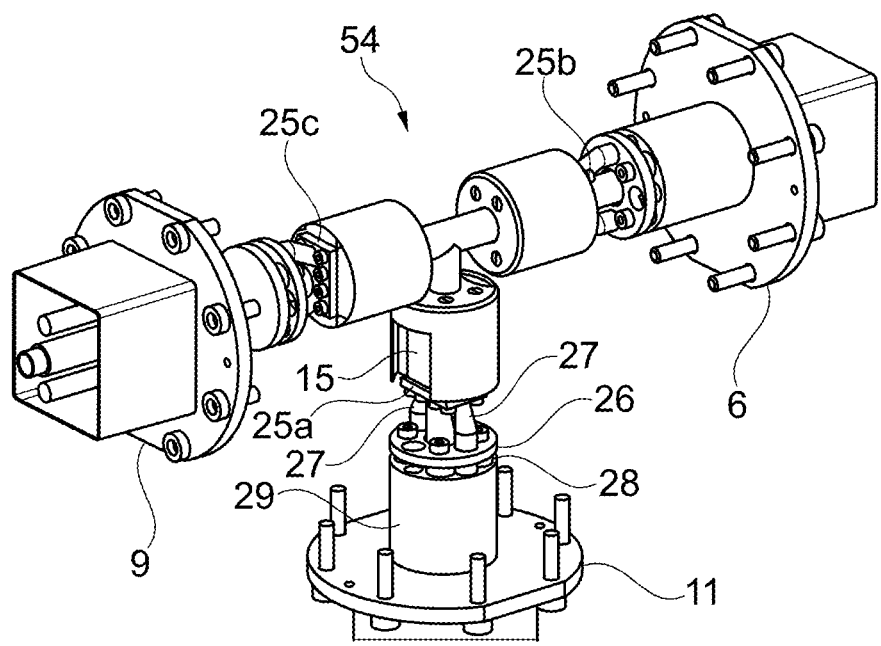
FIG. 5 shows the second variant of the distributor unit according to the invention with fluidic connections produced.
Figure 6:
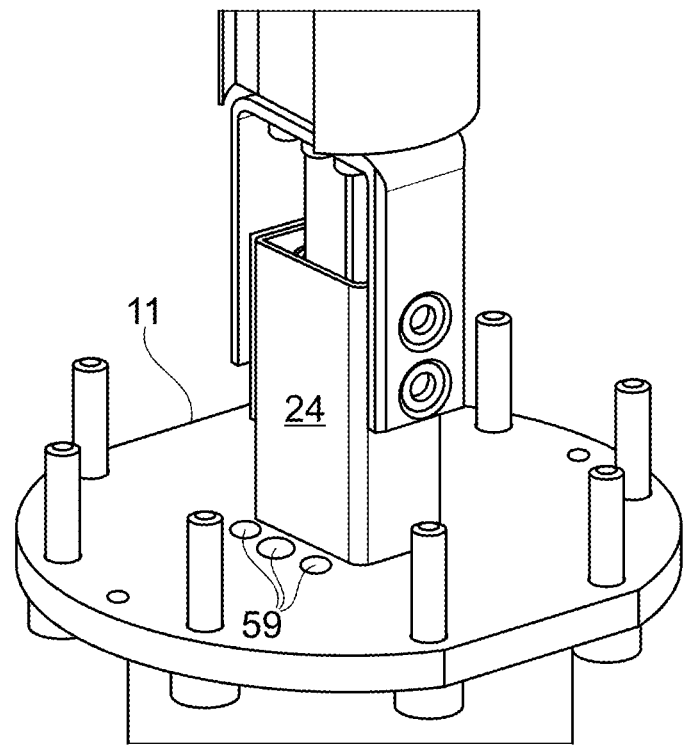
FIG. 6 shows a detail from FIG. 4.

FIG. 5 shows the triple-flow distributor unit 54 in the assembly or with fluidic connections made with external (thermal) lines of the upright 11, the first support arm 6 and the second support arm 9. Triple-flow mating flanges 25a, 25b, 25c to the rotational blocks 15a, 15b, 15c are each held by an intermediate flange 26. The mating flange 25a, 25b, 25c is supported by the outer pipes 27, which are permanently welded to the respective mating flange 25a, 25b, 25c. The intermediate flange 26 is bolted via insulating sleeves 28 to a round tube 29 with a flange on the end face that is permanently welded to the upright 11 or the support arms 6, 9. The intermediate flange 26 and an end flange of the round tube 29 each have a correspondingly large opening in the center, so that there is an annular gap to the hot inner pipe 30 (see FIG. 7) with superheated steam. FIG. 6 shows details of the mounts of the double-flow distributor unit. Guides 59 for electrical lines (e.g. PV, operating current for the control unit, signalling line) are provided on the flange of the upright 11 next to the square tube 24.

Figure 7:
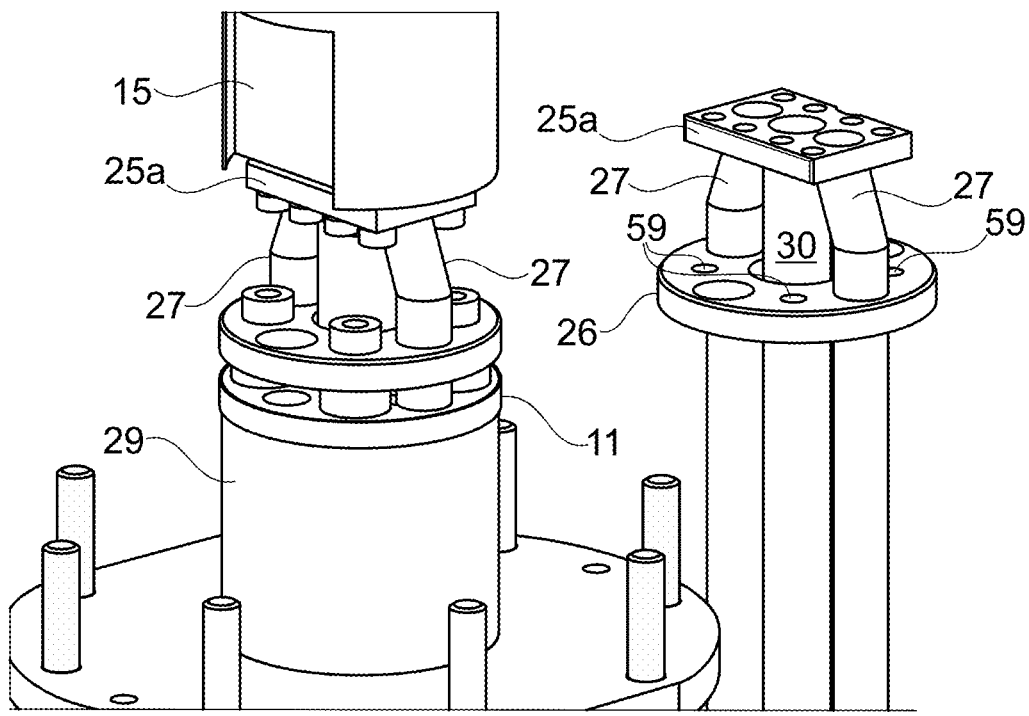
FIG. 7 shows a detail from FIG. 5 with a detailed view of the mating flange of the upright.

FIG. 7 shows details of the mounts of the triple-flow distributor unit 54 (here: on the upright 11). The two outer external lines or pipes 27 and the external inner line or pipe 30 are welded to the respective mating flange (first mating flange 25a in this case). The outer pipes 27 are also welded to the intermediate flange 26 and support it. All other passages or guides 59 on the intermediate flange 26 (e.g. for superheated steam line 30, electrics, cleaning line) have an annular gap. The end flange of the round tube 29 of the upright 11 also has corresponding non-contact openings for the three external lines 27 and 30 (1× supply and 2× return) and, if necessary, for other cables and lines. The support arms 6, 9 have an analogue design in this respect.

Figure 8:
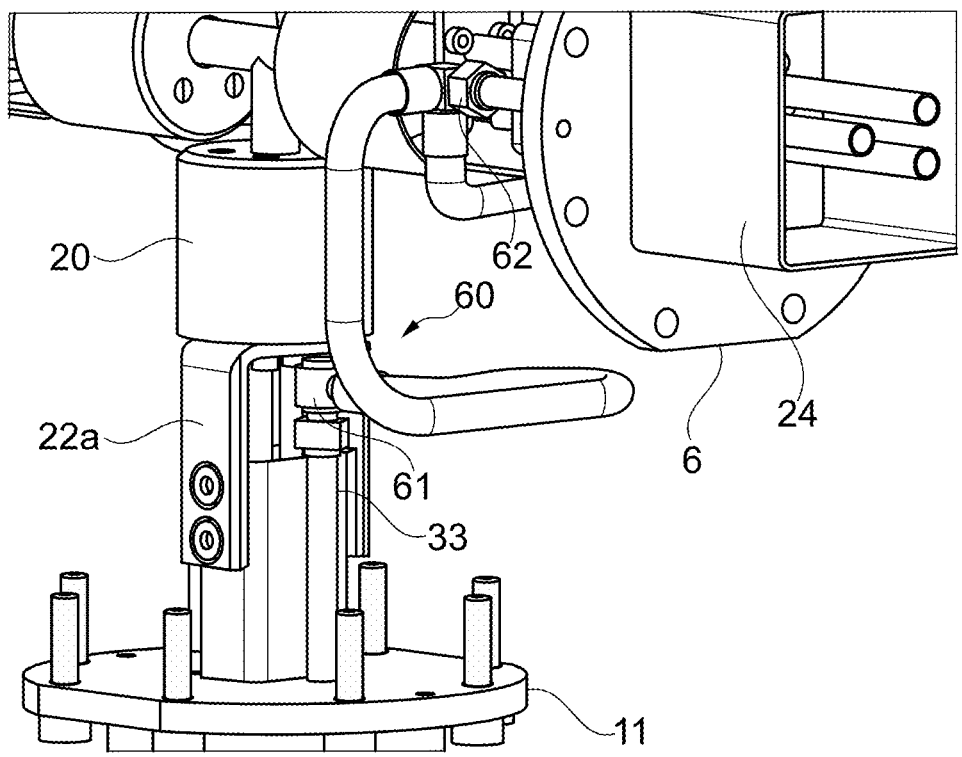
FIG. 8 shows a schematic representation of a first variant of the cleaning device.
Figure 9:
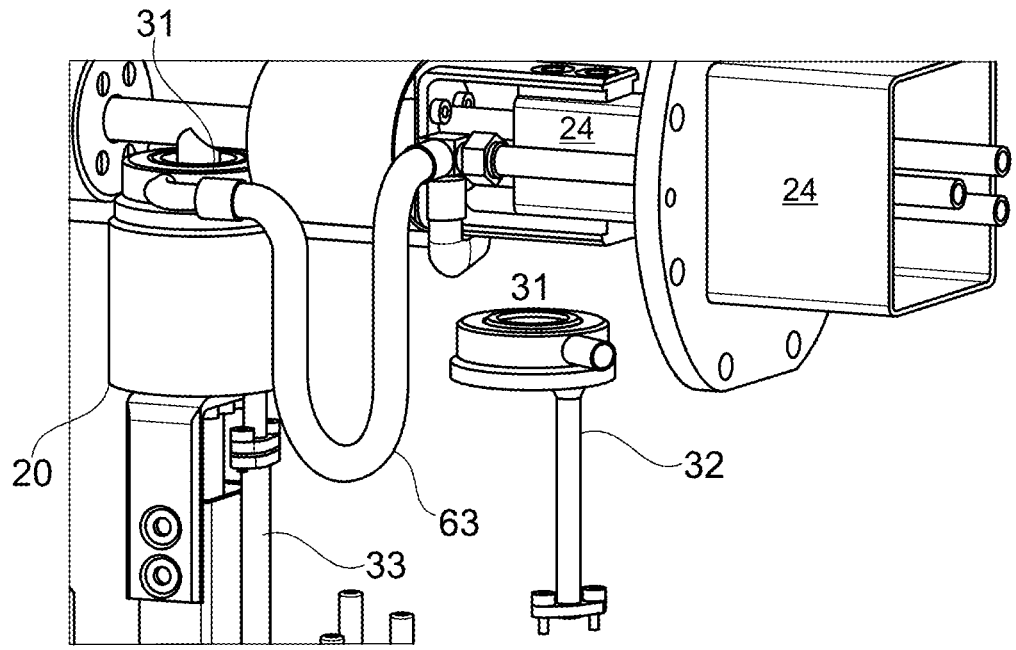
FIG. 9 shows a schematic representation of a second variant of the cleaning device.

FIG. 8 shows the cleaning device 60 according to variant A. A twistable hose connection 61 with a branch 62 to the support arms 6 and 9 (not shown) is attached to a pipe socket 33, which projects from the upright 11 into the interior of the housing 53 by means of a union nut. FIG. 9 shows the cleaning device according to variant B. A rotary feedthrough 31 is arranged above the casing bushing 20 of the first rotational block 15a (vertical rotational block). The pipe socket 32 of the rotary feedthrough 31 is fed through the space between the rotational block 15a (concealed in the picture by the sheathing bushing 20) and the sheathing 20 and is screwed to the pipe socket 33, which pipe socket 33 projects from the upright 11 into the interior of the housing 53, via a flange connection to form a seal. In this case, the hose 63 may be rigid.

Figure 10A:
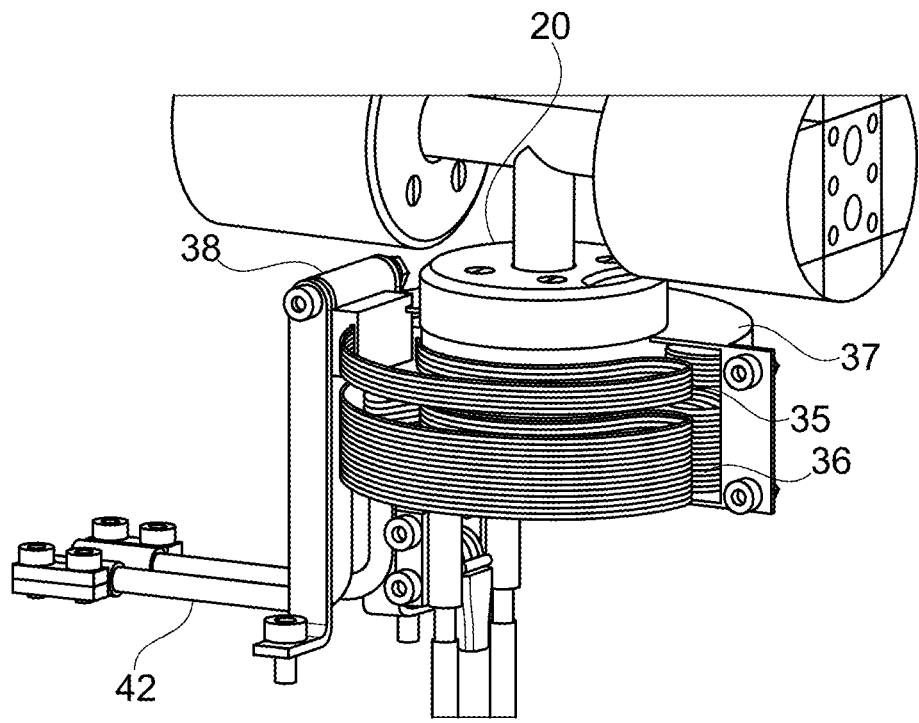
FIG. 10A shows a schematic representation of a first variant of the rotary housing.
Figure 10B:
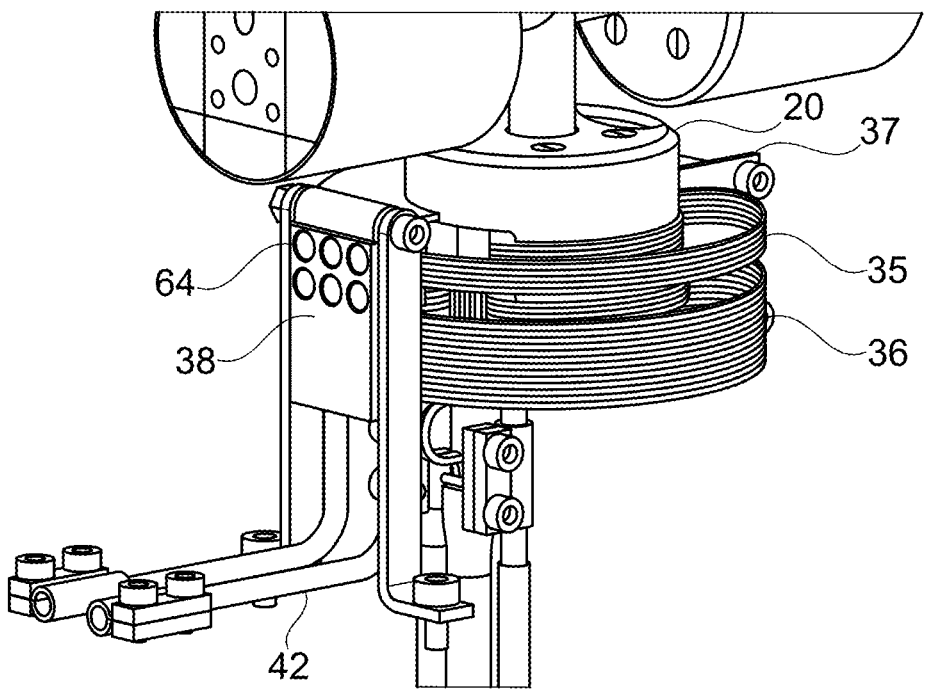
FIG. 10B shows a schematic representation of the first variant of the rotary housing from a second perspective.

FIG. 10A shows the electrical connection according to variant A in a first view. In the annular gap of a rotating housing 37, which is centered over the sheathing bushing 20 or arranged around the sheathing bushing 20, cable harnesses 35, 36 are laid in mirror symmetry in both directions, which take part in a rolling rotary movement. The first cable harness 35 supplies a distributor box 38 with plug contacts 64. The second cable harness 36 is used for a PV connection with two poles. The PV lines 42 are discharged behind the distributor box 38—i.e. between the distributor box 38 and the rotary housing 37. The rotary housing 37 is configured in two parts here. The front side is removable and hidden in this view (FIG. 10A). The distributor box 38 is fixed to or between the two halves of the rotary housing 37. FIG. 10B shows another perspective of this electrical connection according to variant A; in particular, the plug contacts 64 of the distributor box 38 are also recognisable here.

Figure 11:
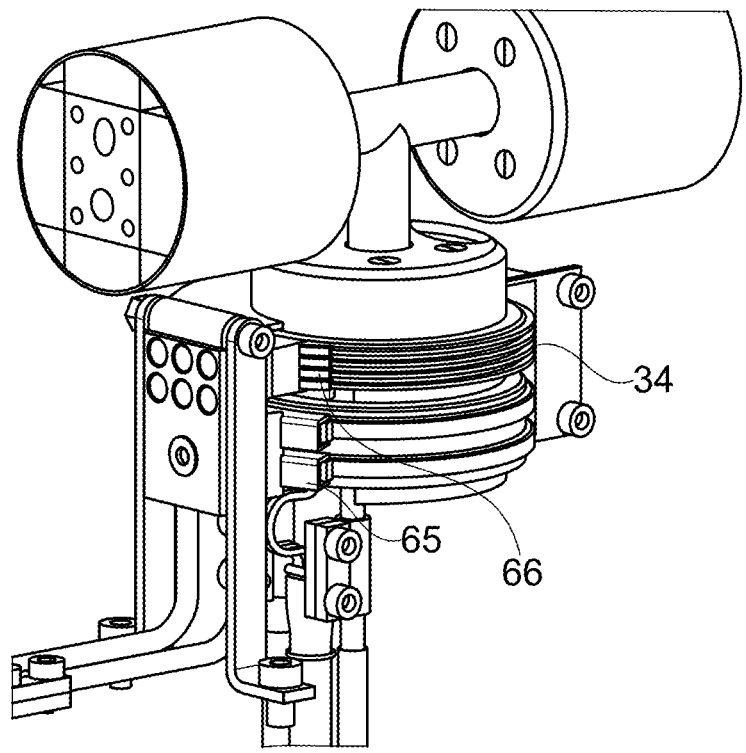
FIG. 11 shows a schematic representation of a second variant of the rotary housing.
Figure 12:
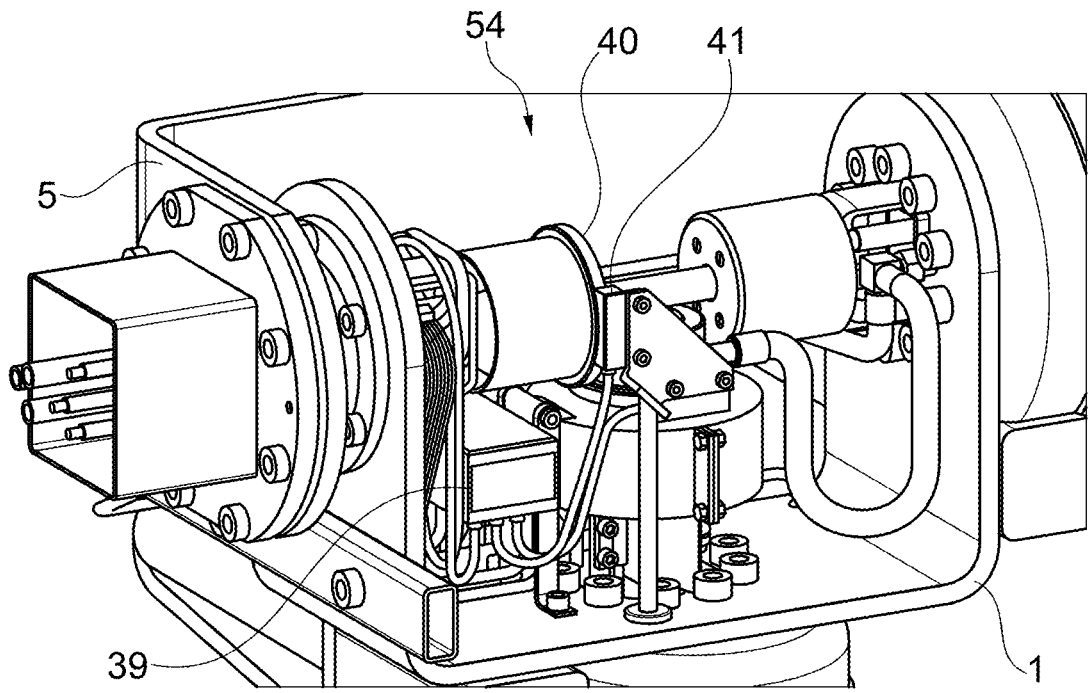
FIG. 12 shows a schematic view of a second variant of the tracking unit according to the invention.

FIG. 11 shows the electrical connection according to variant B. Slip rings 34 and sliding contacts 65 are used here instead of cable harnesses 35 and 36. FIG. 12 shows a fully equipped tracking unit with double-flow distributor unit 54, whereby, in contrast to FIGS. 2 to 11, the support frame 1, the swiveling bracket 5 and the bearing block 4 of the tracking unit 43 may also be seen here. The cover is not shown. A control unit 39, angle-coded rings 40 and angle sensors 41, shown here only schematically, are new.

Figure 13:
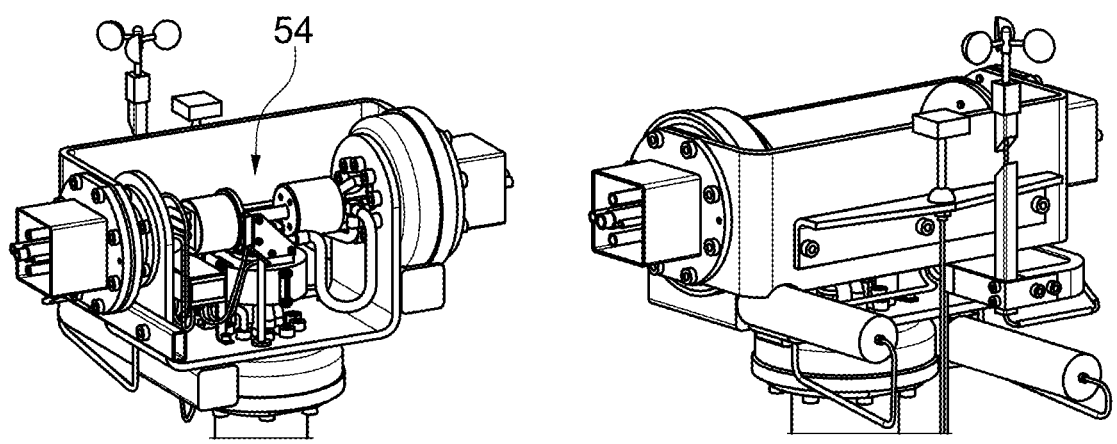
FIG. 13 shows a schematic view of a third variant of the tracking unit according to the invention.

FIG. 13 shows two views of a fully assembled tracking unit 43 (without cover) with triple-flow distributor unit 54. The second cable harness 36 for PV is omitted here, as only steam superheating is required. Further sensors may also be seen, in particular a wind sensor, which sensors are attached to the tracking unit 43 or its housing.

The invention claimed is:

1. A tracking unit for a solar installation, the tracking unit comprising:

a housing with a housing interior, the housing configured to accommodate a distributor unit in the housing interior, the housing comprising a support frame and a cover detachably connected to the support frame, the distributor unit being for the tracking unit and comprising:
  a first line section with a first rotational block, the first rotational block being configured to establish a fluidic connection between the first line section and a base element; and
  a second line section with a second rotational block, the second rotational block being configured to establish a fluidic connection between the second line section and a first support arm of the solar installation;
at least a first gear for rotation about a vertical axis and a second gear for rotation about a horizontal axis;
wherein the first line section is rotatably connected to the first rotational block;
wherein the second line section is rotatably connected to the second rotational block;
wherein a gear housing of the first gear is connected to the support frame in a torsionally rigid manner and an output of the first gear is accessible from an outside configured to be connected to the base element; and
wherein a gear housing of the second gear is connected to the support frame in a torsionally rigid manner and an output of the second gear is accessible from the outside configured to be connected to a first support arm of the solar installation.

2. The tracking unit according to claim 1, wherein the first gear and the second gear are each configured as a slewing ring gear.

3. The tracking unit according to claim 1, wherein:
the support frame has at least one first feedthrough opening for making connections with the base element, and a second feedthrough opening for making connections with the first support arm; and
the first feedthrough opening surrounds the vertical axis and the second feedthrough opening surrounds the horizontal axis.

4. The tracking unit according to claim 3, wherein:
the support frame has a third feedthrough opening for establishing connections with the second support arm; and
the third feedthrough opening surrounds the horizontal axis.

5. The tracking unit according to claim 4, wherein:
the tracking unit has a swiveling bracket for receiving the first support arm and the second support arm, wherein the swiveling bracket in the region of a first passage opening is configured to be connected to the output of the second gear by means of the first support arm; and
the swiveling bracket in the region of a second passage opening is configured to be connected to the housing by means of the second support arm.

6. The tracking unit according to claim 5, wherein the support frame has a bearing block in the region of the third feedthrough opening configured to accommodate a hollow shaft of an intermediate flange, which intermediate flange is arranged between the second support arm and the swiveling bracket for connecting the second support arm to the housing.

7. The tracking unit according to claim 6, wherein the bearing block has a rotary seal configured to seal the housing in the region of the contacting of the swiveling bracket.

8. The tracking unit according to claim 1, wherein the distributor unit is arranged inside the housing.

9. The tracking unit according to claim 8, wherein a cleaning device is arranged in the housing interior, the cleaning device having means for supplying cleaning agent to at least one of the first support arm and the second support arm.

10. The tracking unit according to claim 9, wherein the means for supplying cleaning agent comprises at least one of:
- at least one flexible hose;
- at least one rotatable hose connection; and
- at least one rotary feedthrough.

11. The tracking unit according to claim 8, wherein:
a rotary housing is mounted on an outer side of the sheathing bush of at least one of:
- the first rotational block,
- the second rotational block, and
- the third rotational block; and the rotary housing accommodates at least one of:
- slip rings and sliding contacts, and
- flexible cable harnesses.

12. The tracking unit according to claim 8, wherein a distributor box with one or more connections is arranged inside the housing.

13. The tracking unit according to claim 8, wherein an electronic control unit with connections for units, is arranged inside the housing.

14. The tracking unit according to claim 13, wherein one or more sensors are arranged inside the housing, the one or more sensors being configured to read angle information via angle-coded rings and forward the angle information to the control unit, the angle-coded rings being arranged on a sheathing bushings of at least one of:
- the first rotational block,
- the second rotational block, and
- the third rotational block.

15. A solar installation comprising:
a tracking unit comprising:
  a housing with a housing interior, the housing configured to accommodate a distributor unit in the housing interior, the housing comprising a support frame and a cover detachably connected to the support frame, the distributor unit being for the tracking unit and comprising:
    a first line section with a first rotational block, the first rotational block being configured to establish a fluidic connection between the first line section and a base element; and
    a second line section with a second rotational block, the second rotational block being configured to establish a fluidic connection between the second line section and a first support arm of the solar installation;
  at least a first gear for rotation about a vertical axis and a second gear for rotation about a horizontal axis;
  a base element; and
  a first support arm with at least one of at least one solar collector and solar cells attached thereto;
wherein the first line section is rotatably connected to the first rotational block;
wherein the second line section is rotatably connected to the second rotational block;
wherein a gear housing of the first gear is connected to the support frame in a torsionally rigid manner and an output of the first gear is accessible from an outside configured to be connected to the base element;
wherein a gear housing of the second gear is connected to the support frame in a torsionally rigid manner and an output of the second gear is accessible from the outside configured to be connected to a first support arm of the solar installation; and
wherein the first rotational block is fluidically connected in a sealing and torsionally rigid manner to lines of the base element and the second rotational block is fluidically connected in a sealing and torsionally rigid manner to lines of the first support arm.

16. The solar installation according to claim 15, wherein:
the solar installation comprises a second support arm with at least one of at least one solar collector and solar cells attached thereto; and
a third rotational block is fluidically connected to lines of the second support arm in a sealing and torsionally rigid manner.

17. The solar installation according to claim 15, wherein:
in the case of double-flow rotational blocks, the fluidic connection is produced by means of double-flow mating flanges of the base element of the first support arm, which mating flanges are fastened to the connecting portions of the rotational blocks; and
the mating flanges are preferably permanently connected to at least one of the base element, the first support arm, and the second support arm via insulating jaws or are formed in one piece therewith.

18. The solar installation according to claim 15, wherein:
in the case of triple-flow rotational blocks, the fluidic connection is established by means of triple-flow mating flanges of the base element the first support arm, which mating flanges are attached to the connecting sections of the rotational blocks;
the intermediate plates are each fastened via insulating sleeves to receptacles of at least one of the base element, the first support arm, and the second support arm, which receptacles have guides for a feedthrough of at least one of the two external return lines, an internal supply line, and other lines or cables.

19. The solar installation according to claim 17, wherein the lines of at least one of the base element, the first support arm, and the second support arm are sealingly connected to the mating flanges.

20. The solar installation according to claim 15, wherein:
the base element is connected to the output of the first gear; and
the first support arm is connected to the swiveling bracket and to the output of the second gear in the region of the first passage opening of the swiveling bracket.

* * * * *